March 2, 1948. A. PECHUKAS 2,437,171
COMPOSITE TITANIUM DIOXIDE-METAL OXIDE PIGMENT
Filed Nov. 10, 1943 2 Sheets-Sheet 1
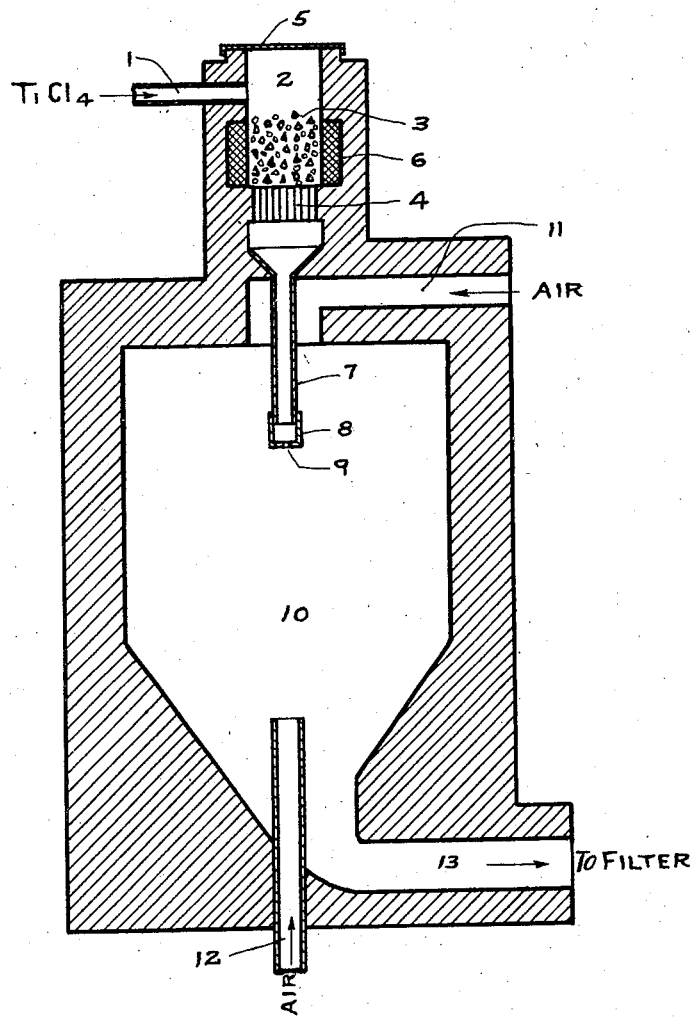
FIG-1
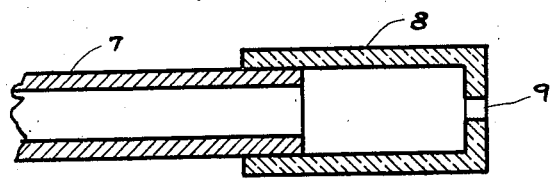
FIG II
INVENTOR.
ALPHONSE PECHUKAS
BY Donald J Haefele March 2, 1948. A. PECHUKAS 2,437,171
COMPOSITE TITANIUM DIOXIDE-METAL OXIDE PIGMENT
Filed Nov. 10, 1943 2 Sheets-Sheet 2
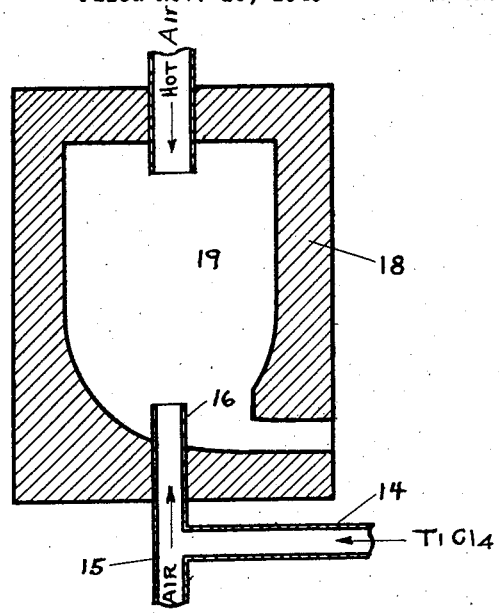
FIG. III
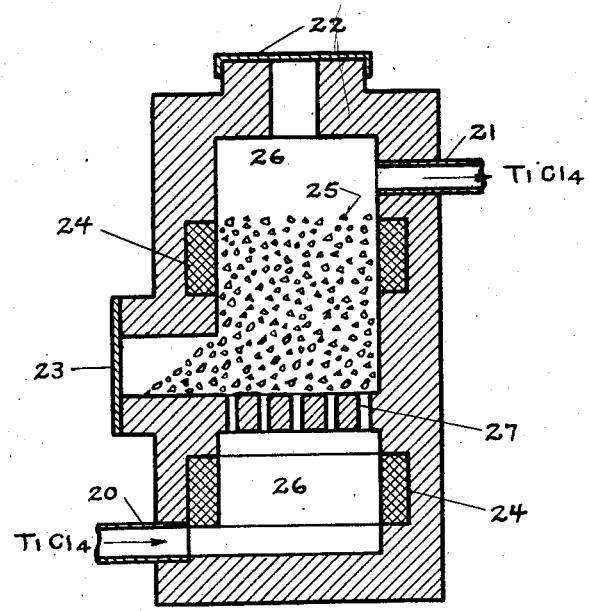
FIG. IV
INVENTOR.
ALPHONSE PECHUKAS
BY Donald J Hazfeld Patented Mar. 2, 1948

2,437,171

UNITED STATES PATENT OFFICE 2,437,171

COMPOSITE TITANIUM DIOXIDE-METAL OXIDE PIGMENT

Alphonse Pechukas, Akron, Ohio, assignor to Pittsburgh Plate Glass Company, Pittsburgh, Pa., a corporation of Pennsylvania Application November 10, 1943, Serial No. 509,703

4 Claims. (Cl. 106—300)

This invention relates to a method of preparing modified titanium dioxide pigments. More specifically it relates to pigments which contain small amounts of the oxides of other metals uniformly dispersed therein.

One object of this invention is to provide a method of preparing a mixed pigment of a more uniform composition than can be obtained by milling the pigments in desired proportions. A further object is to provide a method of preparing titanium dioxide pigments containing very small amounts of modifying agents such as aluminum oxide or colored pigments such as chromic oxide.

Application Serial No. 405,418 issued on April 25, 1944, as U. S. Letters Patent 2,347,496 to Irving E. Muskat and myself jointly describes and claims methods of preparing mixed pigments of titanium dioxide and an oxide of chromium by the thermal decomposition of mixtures of titanium tetrachloride and chromic chloride. I have invented a simple and convenient method of preparing similar titanium dioxide pigments containing minor proportions of admixed oxides of other metals. The method contemplates generally the step of passing hot vaporized titanium tetrachloride in contact with the metallic oxide which is desired as the modifying agent in the mixed pigment. In the presence of hot titanium tetrachloride the oxides are chlorinated, vaporized, and homogeneously dispersed in the titanium tetrachloride. Subsequently, the mixed halides are decomposed by contacting with oxygen and filtered from the gas stream. The final product may be calcined in the usual manner to eliminate traces of chlorine.

Titanium tetrachloride vapors useful in this process may be prepared by the chlorination of titanium ores in the presence of carbon. The crude vapors so produced may contain residual chlorine which is not entirely removed by the procedures used to remove iron chloride, for example by washing with liquid titanium tetrachloride. The excess chlorine content of the gaseous chlorination product will assist the chlorination of the modifying agent and permit the reaction at a lower temperature than would otherwise be possible.

By my new method very intimate mixtures of titanium dioxide with other modifying oxides may be obtained. Silicon dioxide, zinc oxide, aluminum oxide may be added to improve the color stability, oil absorption, particle size, chalking characteristics and other essential physical and chemical properties of the pigment. Other oxides such as lead oxide, chromic oxide, and iron oxide may be added to produce tinted pigments. Similarly the colors may be blended by using two or more colored oxides in suitable proportions.

A preferred modification of the invention is demonstrated by Figure I of the accompanying drawings. A conduit 1 conducting the titanium tetrachloride from a vaporizer or from a chlorination furnace is shown leading into the preliminary reactor 2 which has a substantially increased cross-section area for the purpose of reducing the linear velocity of the gas. The titanium tetrachloride then passes through a porous bed 3 containing the metal oxide which is used to modify the final pigment. The porous bed may be comprised of large granules of the metal oxide or it may contain a small proportion of metal oxide suspended on a carrier of porcelain, coke, asbestos, or other inert material which will provide ample interstices to facilitate the passage of the gas stream. A perforated diaphragm 4 supports the porous bed. The reactor should be provided with a charging door 5 suitable for withdrawing the residue or spent charge. In passing through the porous body containing metal oxide the titanium tetrachloride at proper temperatures will react with the metal oxide and produce the corresponding chloride. The gas stream entering must necessarily be at a temperature which will enable the chlorination to proceed. Accordingly, it may be necessary to preheat the gas stream or to heat the preliminary reactor by suitable heating elements 6, especially when oxides having less volatile chlorides, such as chromium chloride, zinc chloride and lead chloride, are used.

The mixed chloride vapors are then drawn off through conduit 7 and passed into furnace 10 where they are mixed with oxygen or an oxygen containing gas. The oxygen stream must be so directed that the entire reaction is conducted out of contact with the furnace walls in order to avoid the formation of macrocrystalline titanium dioxide particles. The air or oxygen may be introduced in parallel flow at 11 or in countercurrent flow at 12. Frequently, it is desirable to introduce part of the air at each of sources 11 and 12. The reaction in zone 10 produces titanium dioxide by the equation:

$$TiCl_4 + O_2 \rightarrow TiO_2 + 2Cl_2$$

The solid titanium dioxide suspended in nitrogen, chlorine and other fixed gases is withdrawn at 13 and separated by means of suitable filters.

The invention may be practiced employing the apparatus shown in Figure I and described above. Other modifications of the same apparatus may be used without departing from the purpose and spirit of the invention. The preliminary reaction by which the modifying constituent of the pigment is chlorinated may be conducted by an upwardly flowing stream of titanium tetrachloride vapor as shown in Fig. IV. This reaction chamber may be a separate structure as shown or it may be constructed as part of the decomposition furnace. A stream of vaporized titanium tetrachloride in conduit 20 is passed into furnace 26 where it may be heated by means of suitable heating elements 24. The gas then passes upwardly through a perforated diaphragm and into the pervious bed of material 25 which contains the oxide of the element which is required to produce the desired modified pigment. Further heating elements 24 are provided adjacent the oxide bed to enable the formation and evaporation of the desired quantity of the modifying constituent. The mixed halide stream is passed into conduit 21 and then to the decomposition furnace which is not shown.

Fig. III shows a cross section diagram of a decomposition furnace 18 modified to prevent the decomposition of titanium tetrachloride in contact with the hot inlet tube. By the use of this apparatus the vaporized halide stream in conduit 14 is mixed with sufficient air from inlet 15 so that the mixture in tube 16 will exist at a temperature less than that required for the decomposition. Generally a temperature below 600° C. will be suitable. A second source of air 17 is preheated to a temperature which will cause the decomposition when the streams of reactants are mixed in furnace chamber 19. Preferably temperatures greater than 700° C. are used for the decomposition.

Another means of preventing the formation of macro-crystalline pigments is shown in Figs. I and II. The end of conduit 7 is enclosed by a porous cup 8 of unglazed porcelain or other pervious material. The cup is provided with an opening 9 at the center of the end face and is made of such composition and thickness that 5 to 15 percent of the titanium tetrachloride passes through the porous wall while 85 to 95 percent passes through the opening 9. By this mechanism the atmosphere outside the porous cup is diluted with the reactants and reaction products which sweep the oxygen away from opening 9. Thus, no coarse crystalline titanium dioxide is formed by contact of the hot tube with the reacting gases.

Further details of the process are set forth in the following specific examples:

*Example I*

Apparatus constructed in accordance with Figure I was used to prepare titanium dioxide pigment. Chromic oxide in coarse granular form was placed in the preliminary reactor. Titanium tetrachloride at 700° C. was passed through the chromic oxide bed maintained at a temperature of 755 to 785° C. by means of heating elements in the furnace wall. The decomposition was conducted at about 900° C. by introducing preheated air in parallel flow. The reaction products were drawn off through a filter. A light green pigment containing 1.3 percent chromic oxide was obtained.

*Example II*

A mixture of titanium tetrachloride and aluminum chloride vapors was produced using apparatus similar to that shown in Figure III. Granular aluminum oxide was placed within the furnace which was maintained at 675° C. by means of electric heating means located in the furnace walls. The vapor mixture contained approximately 2.5 percent aluminum chloride.

The mixed chloride vapors were passed into a decomposition furnace provided with a source of preheated air as in Figure III and provided with a means for introducing air into the vapor inlet tube. The preheated air entered the furnace at above 1200° C. and when contacted with the halide vapors produced complete decomposition. The reaction took place at a temperature of 850 to 900° C. The suspension of titanium dioxide in fixed gaseous products was filtered to yield a stable $TiO_2$ pigment containing 3.7 percent of alumina.

Although the invention has been described with respect to certain specific embodiments, the details thereof shall not be construed as limitations on the scope of the claims except as defined by the following claims.

I claim:

1. The method of preparing a titanium dioxide pigment which comprises passing vaporized titanium tetrachloride through a porous mass of an oxide of another metal which oxide is susceptible of undergoing chlorination upon contact with titanium tetrachloride; maintaining the vapor temperature sufficiently high to form and vaporize a chloride of said metal, permitting only a portion of the titanium tetrachloride to react with the oxide whereby to form a vapor mixture of the resulting metal chloride and titanium tetrachloride, removing the mixture from the porous mass and thermally reacting the vapor mixture with oxygen to convert the chlorides therein to oxides.

2. A method as defined in claim 1 in which the oxide is aluminum oxide.

3. A method as defined in claim 1 in which the oxide is an oxide of chromium.

4. A method as defined in claim 1 in which the oxide is silicon dioxide.

ALPHONSE PECHUKAS.

REFERENCES CITED

The following references are of record in the file of this patent:

UNITED STATES PATENTS

| Number | Name | Date |
|---|---|---|
| 1,850,286 | Mittosch et al. | Mar. 22, 1932 |
| 1,967,235 | Ferkel | July 24, 1934 |
| 2,333,948 | Muskat | Nov. 9, 1943 |

OTHER REFERENCES

Mellor, "Inorganic and Theoretical Chem.," 1927, vol. VII, page 82, lines 1 and 2. (Copy in Division 59.)